United States Patent
Shirk et al.

(10) Patent No.: US 6,249,228 B1
(45) Date of Patent: Jun. 19, 2001

(54) VEHICLE OCCUPANT PROTECTION DEVICE AND SYSTEM HAVING AN ANTI-THEFT, ANTI-TAMPER FEATURE

(75) Inventors: Bryan W. Shirk, Mesa; Jess A. Cuevas, Scottsdale; Ahmad K. Al-Amin, Higley; Timothy A. Swann, Mesa; Roy D. Van Wynsberghe, Mesa; Homer W. Fogle, Jr., Mesa, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/178,393

(22) Filed: Oct. 23, 1998

(51) Int. Cl.$^7$ .................................................. G08B 13/14
(52) U.S. Cl. .................................. 340/572.4; 280/728.1; 701/32
(58) Field of Search ........................... 340/572.4, 825.34, 340/10.1, 10.42; 701/32; 280/728.1

(56) References Cited

U.S. PATENT DOCUMENTS

| | | | |
|---|---|---|---|
| 4,708,060 | | 11/1987 | Bickes, Jr. et al. ............... 102/202.7 |
| 5,550,762 | * | 8/1996 | Doll .................................... 701/29 X |
| 5,570,002 | * | 10/1996 | Castleman ............................ 323/283 |
| 5,761,995 | * | 6/1998 | Laiserin et al. ............... 280/728.1 X |
| 5,932,832 | * | 8/1999 | Hansen et al. ...................... 102/202.4 |
| 5,991,673 | * | 11/1999 | Koopman, Jr. et al. ............... 701/32 |
| 6,070,687 | * | 6/2000 | Wallace et al. ....................... 180/287 |

FOREIGN PATENT DOCUMENTS

| | | | |
|---|---|---|---|
| 19516019 | * | 9/1996 | (DE) . |
| 982 200 | * | 3/2000 | (EP) . |

OTHER PUBLICATIONS

Research Disclosure, May 1998 #409, pp. 523 and 524.
Co-pending Patent Appln. Serial No. 09/018,429, filed Feb. 4, 1998 entitled "Vehicle Occupant Restraint Device, System, and Method Having an Anti-theft Feature".

* cited by examiner

Primary Examiner—Thomas Mullen
(74) Attorney, Agent, or Firm—Tarolli, Sundheim, Covell, Tummino & Szabo L.L.P.

(57) ABSTRACT

A circuit chip (64) contains a semi-conductor bridge circuit ("SCB") (66). The SCB (66) initiates an actuatable device, such as an occupant protection device (16A). The circuit chip (64) also contains a memory (68) that holds an identification (70A) of the actuatable device (16A). Preferably, the circuit chip (64) is part of a vehicle occupant protection system (12). Within the system (12) is a controller (14) and a communication interconnection (44) that permits communication between the controller (14) and the device (16A) to control actuation of the device. The controller (14) includes a theft deterrent function (78) to discern the identity of the device (16A) held within the memory (68). The theft deterrent function (78) also makes a determination as to whether the discerned identity of the device corresponds to a predetermined identity and provides a signal indicative of the determination.

11 Claims, 3 Drawing Sheets

VEHICLE OCCUPANT PROTECTION DEVICE AND SYSTEM HAVING AN ANTI-THEFT, ANTI-TAMPER FEATURE

TECHNICAL FIELD

The present invention is generally directed to an occupant protection system for a motor vehicle, and is particularly directed to an occupant protection system in which theft of air bag modules and the like is deterred. The invention is useful for occupant protection systems in which such theft is likely.

BACKGROUND OF THE INVENTION

Occupant protection systems installed in modern motor vehicles include one or more actuatable protection devices for protecting an occupant. Examples of such protection devices include an air bag, a knee bolster, and a seat belt pretensioner. The protection systems also include one or more sensor devices for sensing vehicle characteristics and/or occupant characteristics. The systems are typically controlled from a central control module.

The air bag modules used in such systems provide targets for thieves because the air bag modules can be removed from the vehicle without special tools, and the air bag modules are relatively expensive components. There is a demand for replacement modules on the open market because the air bag modules are designed as a "use once" component and must be replaced if they are deployed as a result of an accident. Other system components, particularly other "use once" components such as seat belt pretensioners, are theft targets for similar reasons.

SUMMARY OF THE INVENTION

In accordance with one aspect, the present invention comprises a circuit chip that contains a semi-conductor bridge circuit for initiating an actuatable device. The circuit chip also contains a memory that holds an identification of the actuatable device.

In accordance with another aspect, the present invention comprises a vehicle occupant protection system. The system includes an actuatable occupant protection device, a controller, and means for permitting communication between the controller and the device to control actuation of the device. The controller includes means to discern an identity of the device. The controller also includes means for making a determination as to whether the discerned identity of the device corresponds to a predetermined identity and providing a signal indicative of the determination. The device includes an initiator for initiating actuation of the device. The device also includes a memory for holding its identity. The memory is located on a single circuit chip with the initiator.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein.

DESCRIPTION OF PREFERRED EMBODIMENT

Figure 1:
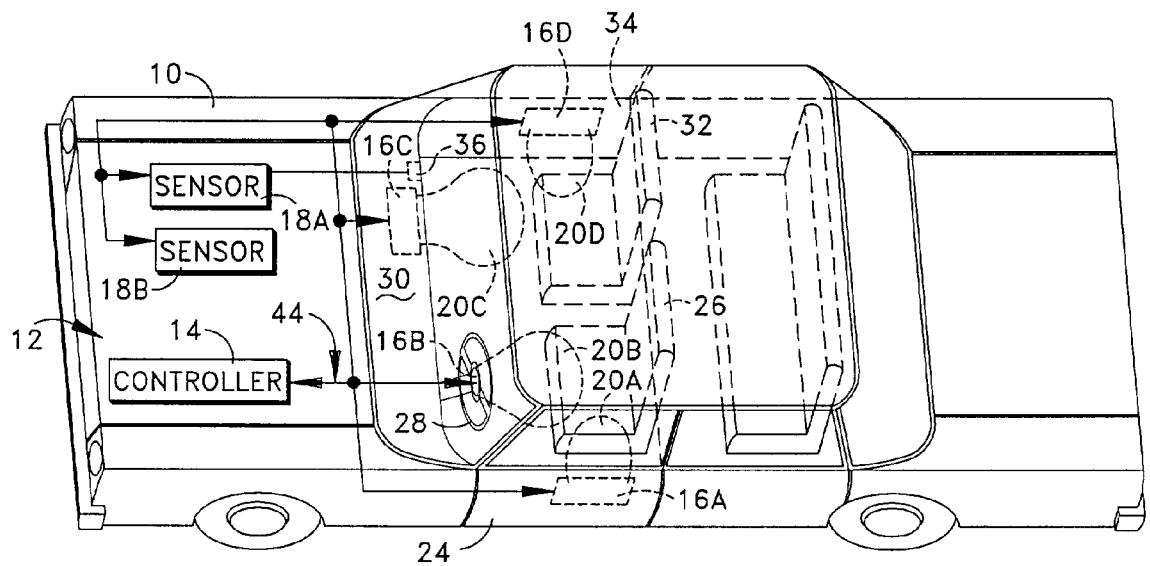
FIG. 1 is a schematic illustration of a vehicle, which includes an occupant protection system that incorporates the present invention.

FIG. 1 shows a vehicle 10 with an occupant protection system 12 that has an anti-theft, anti-tamper feature in accordance with the present invention. The protection system 12 is a distributed system that includes a central controller 14, a plurality of occupant protection devices 16, and a plurality of sensor devices 18 (all shown in block format for simplicity). Any number of protection and sensor devices 16, 18 may be provided within the protection system 12.

In the illustrated example, there are four occupant protection devices 16A–16D, and two sensor devices 18A and 18B. The individual protection and sensor devices are identified via the use of alphabetic suffixes (e.g., "A–D" for the protection devices). The protection devices 16A–16D are referred to collectively and/or generically as protection device(s) 16 (i.e., for discussions that are applicable to any or all of the protection devices). Each protection device 16 is referred to using its specific alphabetic suffix for each discussion that is specific to the particular device. Also, it will be noted that the some of the protection devices 16 have structural elements that are either identical or substantially similar to structural elements of the other protection devices. Such structural elements are identified by identical numbers, but with an alphabetic suffix that corresponds to the suffix associated with that protection device 16. The alphabetic suffixes are sometimes omitted for generic discussions (i.e., discussions that are applicable to all of the structure identified by a particular reference numeral). Similar rules of discussion apply to the sensor devices 18.

It is to be understood that the protection devices 16 and the sensor devices 18 may be any suitable type(s) of device(s) and any combination of devices. For example, the actuatable occupant protection devices 16 may include an inflatable air bag, an inflatable knee bolster, an inflatable seat belt, an inflatable headliner, an inflatable side curtain, and a seat belt retractor lock. Other examples of the actuatable protection devices 16 are seat belt pretensioners and D-ring height adjusters. For the purpose of illustration of the invention and not for the purpose of limitation, the protection devices 16 include inflatable air bags.

Figure 2:
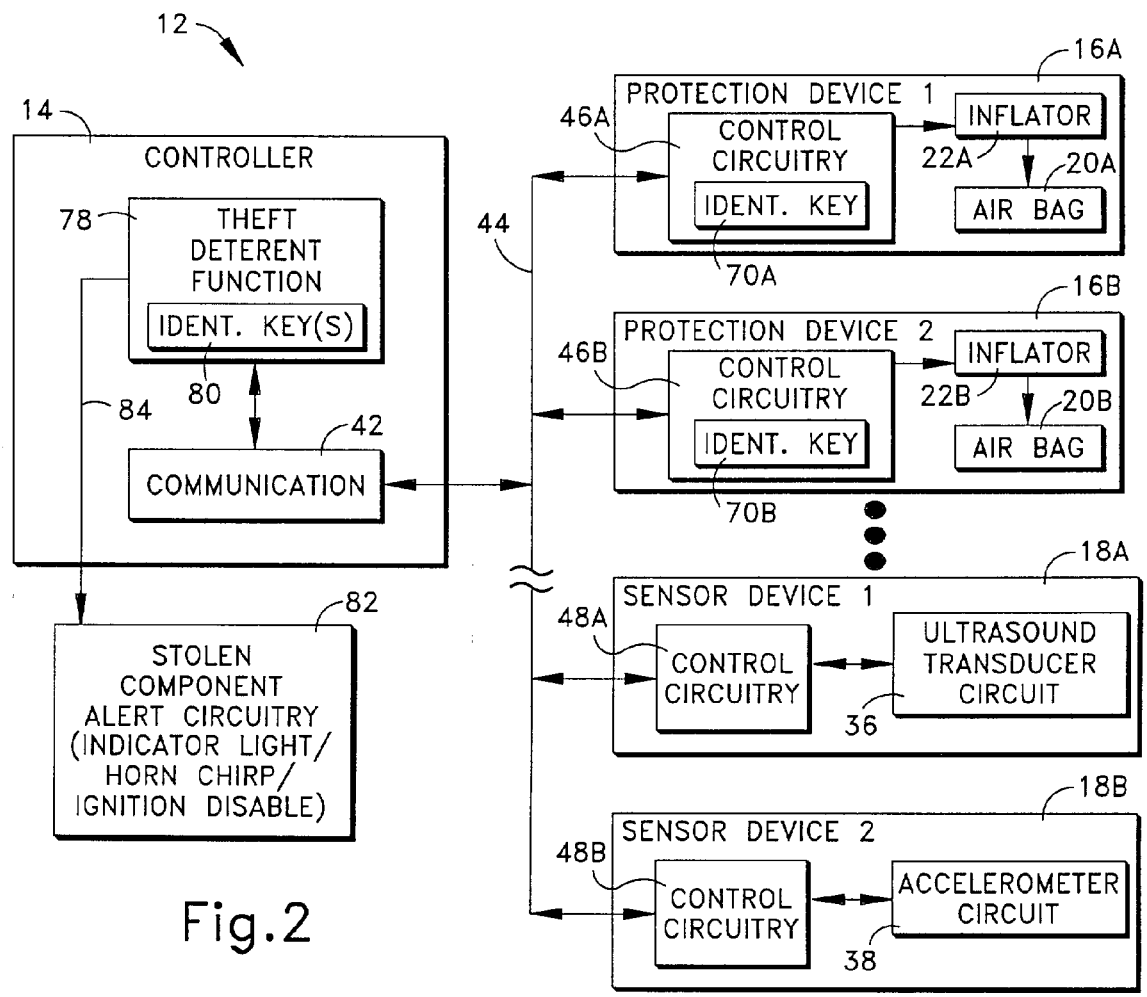
FIG. 2 is a function block diagram of the occupant protection system of FIG. 1.

Each occupant protection device (e.g., 16A, FIG. 2) includes an inflatable air bag (e.g., 20A) that is stored in a folded condition within the respective protection device in a manner known in the art. For each occupant protection device (e.g., 16A), a source (e.g., 22A) of inflation fluid (e.g., nitrogen gas) is provided to inflate the associated air bag (e.g., 20A). The source (e.g., 22A) of inflation fluid is commonly referred to as an inflator, and includes a stored quantity of pressurized inflation fluid and/or an inflation fluid generating material. The protection devices 16 are provided as modules that are readily replaceable after deployment.

In the illustrated example, the first occupant protection device 16A (FIG. 1) is a vehicle side-impact air bag protection device mounted in a driver side door 24. Upon inflation of the air bag 20A of the driver's side door mounted protection device 16A, the air bag 20A extends at a side of a driver's seat 26 of the vehicle 10. The second device is a steering wheel-mounted protection device 16B located within a hub of the vehicle's steering wheel 28. Upon inflation of the air bag 20B of the steering wheel-mounted protection device 16B, the air bag 20B inflates at a location in front of the driver's seat 26.

The third protection device (i.e., 16C) is mounted in a passenger side of an instrument panel 30 of the vehicle 10. The air bag 20C of the panel-mounted protection device 16C inflates at a location in front of a front passenger seat 32 of the vehicle 10. The fourth protection device is a door-mounted protection device 16D located in a passenger door 34 of the vehicle 10. The air bag 20D of the door-mounted protection device 16D inflates at a location to the side of the passenger seat 32.

Each sensor device 18 (FIG. 2) senses a characteristic that is used to determine (a) whether one or more of the occupant protection devices 16 is to be deployed to help protect an occupant and/or (b) whether and to what extent deployment variables of the one or more occupant protection devices are to be adjusted. In the illustrated example, the first sensor device 18A is an ultrasound sensor that has an ultrasonic transducer circuit 36 for sensing the presence and position of a front seat passenger (not shown). The transducer circuit 36 is located within the instrument panel 30 (FIG. 1), and includes a component for emitting and receiving ultrasonic signals. Ultrasonic signals are emitted from the sensor device 18A toward the front seat passenger location and are reflected or "bounced" off of a passenger located on the front seat. The emission and reception of reflected ultrasonic signals provides information, such as time-of-flight, which is used to discern the presence and location of a front seat passenger with respect to the instrument panel 30, and thus the protection device 16C. The first sensor 18A includes suitable circuitry and components (e.g., transducer drive/monitor circuitry) that are operatively connected to perform the occupant sensing function. The structure and function of an ultrasonic sensor are known in the art.

The second sensor device 18B includes an accelerometer circuit 38 (FIG. 2) that is responsive to sensed vehicle crash acceleration. The accelerometer circuit 38 provides a signal that has a characteristic (e.g., frequency, amplitude) indicative of the sensed crash acceleration or deceleration. The structure and function of an accelerometer sensor is known in the art. It is to be appreciated that although only two sensor devices 18A and 18B are illustrated in FIG. 1, additional and/or different sensor devices can be included within the protection system 12.

The controller 14 may be any suitable device, such as a microcomputer, for controlling operation of the protection system 12. A communication portion 42 of the controller 14 is connected to a communication interconnection 44. The communication interconnection 44 may have any suitable structure for conveying signals. In one embodiment, the communication interconnection 44 includes a communication bus. In another embodiment, the communication interconnection 44 is a two or three wire system for serial communication. The communication that occurs on the communication interconnection 44 is duplexed.

Preferably, the controller 14, via its communication portion 42, supplies electrical energy to the communication interconnection 44 for use by the devices 16/18. Thus, the controller 14 provides power to the devices 16/18. Any known arrangement for supplying power, in addition to communication signals, via the communication interconnection 44 may be employed.

Each protection device 16 includes control circuitry 46, and each sensor device 18 includes control circuitry 48. The control circuitry 46/48 is connected to the communication interconnection 44. The control circuitry 46/48 functions to communicate with the controller 14 and to control operation of the respective device.

It should be noted that although the various devices (i.e., protection devices 16 and sensor devices 18) may be different, each has similar control circuitry 46/48 with regard to communication. Specifically, the control circuitry 46/48 for each device 16/18 contains logic and memory circuitry, and is addressable and programmable. Within each device 16/18, the addressable aspect of the control circuitry 46/48 is provided such that the controller 14 can direct communication signals to one or more specific devices and each device "knows" when a communication signal is directed to that particular device.

With regard to the first sensor device 18A, the control circuitry 48A controls operation of the drive/monitor circuitry for the transducer circuit 36 and provides signals indicative of the sensed occupant presence and location to the controller 14. With regard to the second sensor device 18B, the control circuitry 48B controls operation of the accelerometer circuit 38 and provides signals indicative of the sensed crash acceleration to the controller 14.

The controller 14 receives the signals containing sensory information from the control circuitry 48 of the two sensor devices 18. The controller 14 processes information provided by the sensor devices 18 to make determinations regarding protection device control (e.g., the controller performs one or more algorithms). Such processing is known in the art. The controller 14 provides command signals to the control circuitry 46 of each protection device 16. Included within the command signals are signals for deployment control of the protection devices 16.

Figure 3:
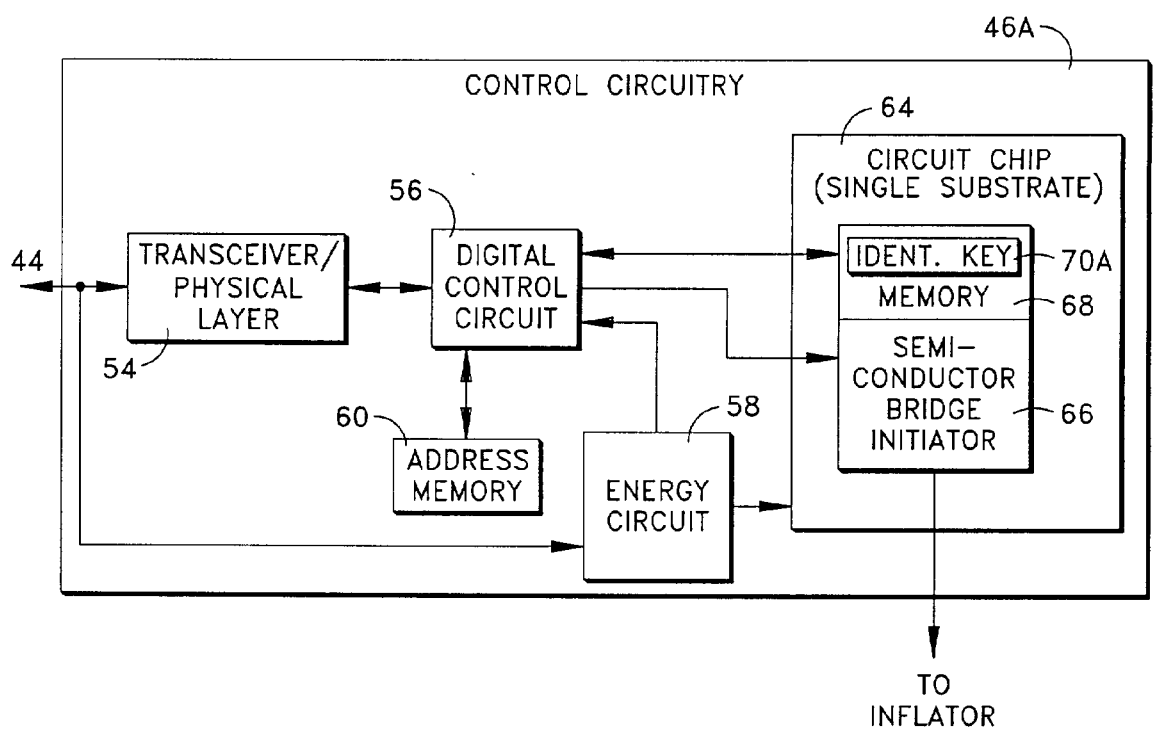
FIG. 3 is a schematic illustration of a control circuitry of a protection device of FIG. 2.

A schematic illustration of a preferred embodiment of the control circuitry 46A for the protection device 16A is provided by FIG. 3. The control circuitry 46 for each of the other protection devices (e.g., 16B) is similar.

Within the control circuitry 46A, a transceiver/physical layer 54 is connected to the communication interconnection 44 for supplying signals to the communication interconnection and for receiving signals for the protection device 16A. A digital control circuit 56 is connected to the transceiver/physical layer 54. The control circuit 56 provides processing and control within the protection device 16A and communicates with the transceiver/physical layer 54. Known structures for the transceiver/physical layer 54 and the control circuit 56 may be utilized.

An energy reserve circuit 58 is connected to the communication interconnection 44, and receives energy from the controller 14, via the communication interconnection. The energy reserve circuit 58 has any suitable structure, such as a storage capacitor, and provides electrical power to components of the control circuitry 46A.

A memory 60 is connected to the control circuit 56. Address information for the protection device 16A that contains the control circuitry 46A is stored within the memory 60. The memory 60 is accessed by the control circuit 56 to determine whether a communication signal received from the communication interconnection 44 is intended for the protection device 16A. Also, the address of the protection device 16A is included in communication signals from the protection device 16A, such that the origin of the signal can be determined by the receiving component (i.e., the controller 14).

The control circuit 56 is connected to a circuit chip 64 that contains an initiator 66. Preferably, the initiator 66 is a semi-conductor bridge circuit ("SCB"). In response to one or more signals from the control circuit 56, sufficient electrical energy is applied to the SCB 66 to ignite the SCB. In turn, the SCB 66 activates the inflator 22A (e.g., ignites gas generating material and/or opens a pressurized container). In one embodiment, the electrical energy for igniting the SCB 66 is provided from the energy reserve circuit 58.

A memory circuit 68 is part of the circuitry located on the circuit chip 64. The memory 68 contains an identification key 70A of the protection device 16A. The identification key 70A is accessed from the memory 68 by the control circuit 56 and provided to the central controller 14 in response to an inquiry signal from the controller. Specifically, the identification key 70A is sent, via signal on the communication interconnection 44, to the controller 14 for comparison verification. The verification procedure in the protection system 12 is a theft deterrent feature.

For each protection device 16, the memory 68 that holds the identification key 70 is a permanent, non-volatile storage device. In other words, the identification key 70 is stored in a read-only memory ("ROM"). Specifically, a programmable read-only memory ("PROM"), an erasable read-only memory ("EPROM"), or an electronically erasable programmable read-only memory ("EEPROM") can be used. Further, the memory 68 may be a one time programmable ("OTP") memory. Each memory 68 is encoded or programmed by authorized personnel.

Each identification key 70 is a security number or code that is not changeable, or at least not readily changeable, by unauthorized personnel (e.g., a car thief). Examples of identification keys 70 include an 8 or 16 bit word that is randomly assigned. Other examples of identification keys 70 include the vehicle serial number or a serial number assigned to all or part of the protection system 12.

In accordance with one embodiment of the present invention, all of the identification keys 70 are identical, but uniquely associated with a specific system 12. The phrase "specific system" refers to the protection system of a single vehicle 10, as opposed to the protection systems of other vehicles. In accordance with another embodiment of the present invention, the identification keys 70 are unique, in addition to being associated with a specific system 12. For the purpose of explanation of the disclosed example, the identification keys 70 within the protection system 12 are unique.

It should be understood that the terminology of "unique" is intended to encompass "effectively unique." For example, during mass-production manufacture of the protection system 12, identification keys may be reused so long as the frequency of the reuse is limited and their combination with other protection devices 16 is by random assignment. For example, if the identification key 70 had n bits, then, on average, the same identification key would be repeated, during mass-production manufacture, for every $2^n$th unit that is produced. If the identification key 70 had eight (8) bits, then, on average, the same identification key would be repeated for every 256th unit that is produced.

As a further anti-theft measure, the memory 68 that contains the identification key 70 can not be removed, or at least not readily removed, from the respective protection device 16. In the protection devices 16, the memory 68 is integrated into the circuit chip 64 with the SCB 66, preferably in the form of an application specific integrated circuit ("ASIC"). Specifically, the memory 68 and the SCB 66 are located on a single piece of silicon substrate of the circuit chip 64. The memory 68 cannot be removed without destruction of circuit chip 64, and also without rendering the chip, and the contained SCB 66, useless. Placing the SCB 66 and the memory 68 on the single circuit chip 64 is an anti-tamper feature of the present invention.

The controller 14 (FIG. 2) has a theft deterrent function component 78. Identification keys 80 are held within a non-volatile storage device of the theft deterrent function component 78. The identification keys 80 are not changeable, or at least not readily changeable, by unauthorized personnel. Also, the controller 14 is constructed such that the structure that contains the identification keys 80 can not be removed, or at least not readily removed, from the controller 14 without disabling the controller.

The identification keys 80 correspond to the identification keys 70 of the protection devices 16. The identity of the two sets of identification keys 70 and 80 is accomplished by any suitable means. For example, this can be accomplished during manufacture, once the controller 14 and protection devices 16 of a specific system 12 are grouped together (either before, during, or after installation in the vehicle 10). Associated identification keys 70 are provided to (e.g., programmed in) the respective protection devices 16, and the corresponding identification keys 80 are provided to (e.g., programmed in) the theft deterrent function 78 of the controller 14. The provision of the identification keys 70 and 80 is via an external input, e.g., programmed by an authorized technician at the manufacturing facility. Further, one example method for providing the identification keys 70 and 80 to ROMs includes permanent, physical alteration of a "blank" memory to install the particular, unique key.

As another example, the controller 14 is provided with identification keys 80 and the devices are "unprogrammed" prior to assembly. Once the protection system 12 is assembled (e.g., the controller 14 and the protection devices 16 are installed into the vehicle), an initiation procedure is performed for the system via authorized personnel. During the initiation procedure, the controller 14 provides (e.g., programs) the unprogrammed protection devices 16 with associated identification keys 70.

A third example would include protection devices 16 that have individual specific identification keys that are programmed into the devices prior to assembly into the protection system 12. The theft deterrent function 78 includes a learn function that is actuatable only by authorized personnel upon initial assembly of the system. The learn function would query each protection device 16 for its identification key. Subsequently, the theft deterrent function 78 would only accept those keys that it previously learned.

Operatively connected with the theft deterrent function 78 is stolen component alert circuitry 82. The stolen component alert circuitry 82 may include any suitable circuitry that provides notice to the vehicle operator and/or authorities (e.g., the police, and/or automotive repair centers) that an apparently stolen device is present in the protection system 12. The theft deterrent function 78 provides a signal 84 to the stolen component alert circuitry 82 to activate the stolen component alert circuitry upon a determination by the theft deterrent function that an apparently stolen component is present in the protection system 12.

Examples of stolen component alert circuitry 82 include circuitry for lighting an indicator lamp on an instrument panel of the vehicle 10, circuitry for energizing a horn of the vehicle to emit a repeating chirp, circuitry for energizing headlights of the vehicle to flash repeatedly, and circuitry to disable the ignition of the vehicle. Also, the stolen component alert circuitry 82 may include means to store information about the components of the protection system 12 that are suspected of being stolen (e.g., non-matching identification numbers). It is even contemplated that all or part of the protection system can be disabled.

During operation of the vehicle 10, the controller 14 receives sensory input from the sensor devices 18 and, using the sensory input regarding the sensed characteristics, makes determinations regarding protection module control (e.g., the central controller operates a crash algorithm). Also, because the protection devices 16 could have adjustable aspects that are adjustable to tailor deployment of the respective protection device, information derived from such sensed occupant and vehicle characteristics could be used by the controller to determine whether and to what extent the deployment variable(s) of the device are to be adjusted. Such adjustable deployment variables include timing of inflation initiation and pressure of the inflated air bag. The controller 14 would control the adjustment of the deployment variable(s) accordingly.

At some point during each operation of the vehicle 10 (e.g., at ignition turn-on), the theft deterrent function 78 makes determinations as to whether each of the protection devices 16 is apparently a stolen device. Specifically, the theft deterrent function 78, via the communication portion 42 and the communication interconnection 44, receives the identification keys 70 from the protection devices 16. The identification keys 70 are compared to the identification keys 80. If the keys match, the protection system 12 determines that there are no stolen protection devices 16. If all of the keys do not match, the protection system 12 includes at least one stolen protection device 16.

Figure 4:
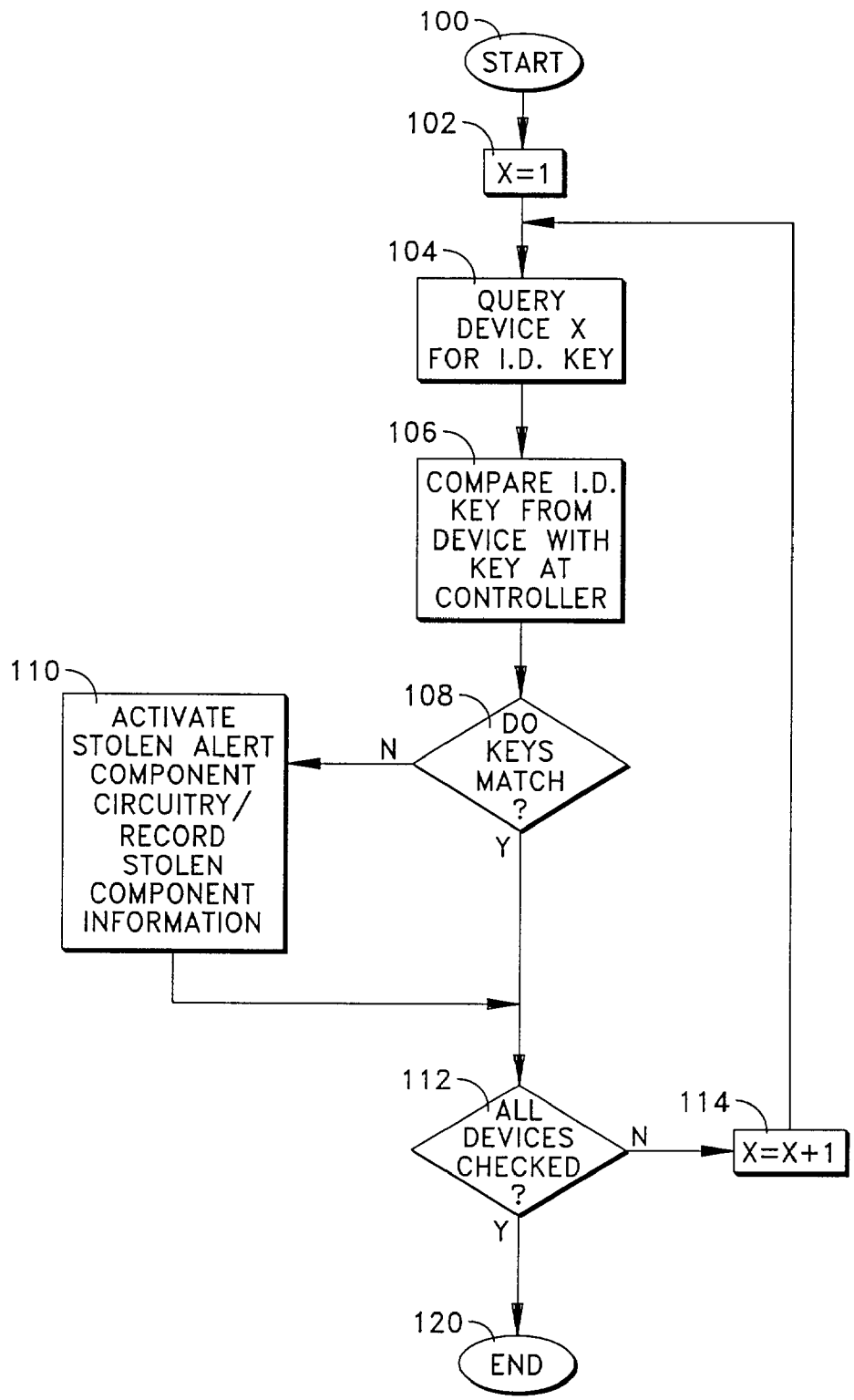
FIG. 4 is a flow chart for a process in accordance with the present invention for determining whether a stolen component is present in the system of FIG. 2.

FIG. 4 shows an example of a process, in accordance with the present invention, performed by the controller 14 to determine if a possible stolen component is present. The process starts at step 100 and proceeds to step 102 in which a variable X is set to an initial value 1. At step 104, the controller 14 queries device X (the first time through the process, device 1) for its identification key 70. The query is done via a signal through the communication interconnection 44. The controller 14 receives the identification key 70 and, at step 106, compares the identification key 70 from the device X with the corresponding key 80 stored within the controller. At step 108, it is determined whether the keys match. If the determination at step 108 is negative (i.e., the keys do not match), the process proceeds to step 110, in which the signal 84 is provided to activate a stolen component alert circuitry 82. In addition, the non-matching identification key from the device is stored within the memory of the controller 14. Once step 110 is complete, the process proceeds to step 112. If the determination at step 108 is affirmative (i.e., the keys match), the process proceeds to step 112.

At step 112, it is determined whether all of the protection devices 16 have been checked. If the determination at step 112 is negative (i.e., the controller is not yet done matching keys), the process proceeds to step 114 in which the variable X is incremented. After step 114, the process proceeds to step 104 in which the next protection device 16 is queried for its identification key. If the determination at step 112 is affirmative (i.e., the controller 14 is done querying all of the protection devices 16, and all of the devices have provided matching identification keys), the process proceeds to step 120 and the query process terminates.

The process of FIG. 4 can be run at any suitable interval to make determinations as to the non-stolen status of the devices. For example, as mentioned above, the process may be run once at each instance in which the vehicle ignition is turned "ON" or periodically during vehicle operation.

If it becomes necessary to replace a protection device 16 (e.g., after a deployment), the vehicle 10 would be taken to an authorized service facility. Replacement procedures would be dependent upon the format used initially to provide (i.e., program) the protection devices 16 and the controller 14 with the identification keys 70 and 80. In the example in which the protection devices 16 are provided (programmed) with an identification key by a technician, the authorized technician can provide an initially unprogrammed, replacement device with the same identification key as the device being replaced.

In the example in which the identification keys are initially provided (programmed) to the protection devices 16 by the theft deterrent function 78 of the controller 14, an unprogrammed (i.e., blank) device can be installed into the protection system 12. During the next query by the controller 14, the controller 14 determines the device is unprogrammed and does not have an identification key (and specifically does not have an erroneous key). The controller 14 provides (programs) the new device with a key.

In the third example in which the theft deterrent function 78 of the controller 14 "learns" the identification keys of the protection devices 16, replacement of a protection device would require reactivation of the learn function of the theft deterrent function 78 by an authorized person.

From the above description of the invention, those skilled in the art will perceive improvements, changes, and modifications. Such improvements, changes, and modifications within the skill of the art are intended to be covered by the appended claims.

Having described the invention, the following is claimed:

1. A circuit chip containing (a) a semi-conductor bridge circuit for initiating an actuatable device and (b) a memory holding an identification of the actuatable device.

2. A circuit chip as set forth in claim 1, wherein the actuatable device is an occupant restraint device, said circuit chip is part of the actuatable occupant restraint device, and said semi-conductor bridge circuit is an initiator for deployment of the occupant restraint device.

3. A circuit chip as set forth in claim 2, wherein the occupant restraint device is part of a vehicle occupant protection system that has a controller, said memory holding the identification of the actuatable device that is to be provided to the controller for verification by the controller.

4. A vehicle occupant protection system comprising:

an actuatable occupant protection device;

a controller; and means for permitting communication between said controller and said device to control actuation of said device;

said controller including means to discern an identity of said device, and means for making a determination as to whether the discerned identity of said device corresponds to a predetermined identity and for providing a signal indicative of the determination; and said device including an initiator for initiating actuation of said device, said device also including a memory for holding its identity, said memory being located on a single circuit chip with said initiator.

5. A system as set forth in claim 4, wherein said initiator is a semi-conductor bridge circuit.

6. A system as set forth in claim 4, wherein said memory of said device stores an identification key that is the identity of said device.

7. A system as set forth in claim 6, wherein said controller includes a memory that stores an identification key, said means for making a determination includes means for comparing the identification key of said device with the identification key stored in said memory of said controller.

8. A system as set forth in claim 6, wherein said memory of said device is non-volatile.

9. A system as set forth in claim 4, wherein said controller includes means for controlling actuation of said device.

10. A system as set forth in claim 9, wherein said device is an inflatable air bag device.

11. A system as set forth in claim 4 including a plurality of actuatable occupant protection devices, and means for permitting communication between said controller and each of said plurality of devices, each of said plurality of devices including an initiator for initiating actuation of the respective device, each of said plurality of devices also including a memory for holding the identity of said device, for each of said plurality of devices said memory being located on a single circuit chip with said initiator.

* * * * *